(12) United States Patent
Amstutz et al.

(10) Patent No.: US 12,092,091 B2
(45) Date of Patent: *Sep. 17, 2024

(54) AXIAL PISTON PUMP

(71) Applicant: Contelec AG, Biel/Bienne (CH)

(72) Inventors: Meric Amstutz, Port (CH); Rolf Bachmann, Busswil (CH)

(73) Assignee: Contelec AG, Biel/Bienne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,215

(22) Filed: Apr. 27, 2023

(65) Prior Publication Data

US 2023/0258165 A1 Aug. 17, 2023

Related U.S. Application Data

(63) Continuation of application No. 17/125,881, filed on Dec. 17, 2020, now Pat. No. 11,692,534.

(30) Foreign Application Priority Data

Dec. 19, 2019 (EP) .................................. 19218312

(51) Int. Cl.
*F04B 27/18* (2006.01)
*F04B 27/08* (2006.01)

(52) U.S. Cl.
CPC .......... *F04B 27/18* (2013.01); *F04B 27/0878* (2013.01)

(58) Field of Classification Search
CPC .................. F04B 27/18; F04B 27/0878; F04B 2201/1204; F04B 2201/1205; F04B 1/2078; G01D 5/241; G01D 5/2415; G01D 5/244; G01D 5/245; G01D 5/5421; G01D 5/2497; G01D 5/145; G01B 7/30

USPC ................................. 341/15; 73/168, 514.39
See application file for complete search history.

(56) References Cited

U.S. PATENT DOCUMENTS

| | | | | | |
|---|---|---|---|---|---|
| 4,008,432 | A | * | 2/1977 | Sugisaki | G01V 3/101 324/207.16 |
| 4,355,959 | A | * | 10/1982 | Kono | F04B 49/20 417/223 |
| 4,480,961 | A | * | 11/1984 | Kono | F04B 49/06 417/15 |
| 4,701,109 | A | * | 10/1987 | Daikohara | F04B 27/1036 417/269 |
| 4,737,079 | A | * | 4/1988 | Kurosawa | F04B 27/1804 417/223 |

(Continued)

FOREIGN PATENT DOCUMENTS

| DE | 3423722 A1 | 1/1986 |
|---|---|---|
| DE | 4015006 A1 | 11/1990 |

(Continued)

*Primary Examiner* — Devon C Kramer
*Assistant Examiner* — Benjamin Doyle
(74) *Attorney, Agent, or Firm* — Avyno Law P.C.

(57) ABSTRACT

An axial piston pump having several pistons has a magnetic encoder (5), which is arranged on a swash plate, and a magnetic field sensor, which is arranged in such a way that it faces towards the magnetic encoder (5). The magnetic encoder (5) has at least two permanent magnets (2, 3) and a plate (4) which consists of a ferromagnetic material. The permanent magnets (2, 3) are arranged on the plate (4) in such a way that they each faces a magnetic pole towards the plate (4), and this pole is at least partially covered by the plate (4) in each case.

18 Claims, 6 Drawing Sheets

(56) References Cited

U.S. PATENT DOCUMENTS

| | | | | |
|---|---|---|---|---|
| 4,783,609 A * | 11/1988 | Sugiyama | ............... | G01P 3/487 310/168 |
| 4,822,252 A * | 4/1989 | Ishikawa | ............ | F04B 27/1804 417/269 |
| 5,022,826 A * | 6/1991 | Matsuda | ................. | F04B 27/18 417/63 |
| 5,046,927 A * | 9/1991 | Ohno | .................. | F04B 27/1804 417/269 |
| 5,059,097 A * | 10/1991 | Okazaki | ............ | F04B 27/1804 417/222.2 |
| 5,081,416 A * | 1/1992 | La Croix | ............... | F16C 33/588 324/207.25 |
| 5,100,301 A * | 3/1992 | Hidaka | ............... | F04B 27/1036 417/269 |
| 5,407,328 A * | 4/1995 | Kimura | ............... | F04B 27/1054 417/63 |
| 5,602,472 A * | 2/1997 | Bergstedt | ................ | G01P 3/487 324/207.16 |
| 6,124,710 A * | 9/2000 | Kordecki | ............ | H02K 11/215 310/68 B |
| 6,247,900 B1 * | 6/2001 | Archibald | ............ | F04B 27/1804 417/63 |
| 6,680,553 B1 * | 1/2004 | Takano | ................. | H02K 29/08 310/68 B |
| 6,753,680 B2 | 6/2004 | Wolf | | |
| 6,848,888 B2 * | 2/2005 | Du | ........................ | F04B 51/00 417/63 |
| 6,991,435 B2 * | 1/2006 | Ochiai | ................ | F04B 27/1804 417/63 |
| 7,151,369 B1 * | 12/2006 | Wolf | ...................... | G01D 5/145 324/207.25 |
| 7,230,419 B2 * | 6/2007 | Godoy | ................. | G01D 11/245 324/207.2 |
| 7,391,208 B2 * | 6/2008 | Wolf | ...................... | G01D 5/147 324/207.2 |
| 7,443,177 B1 * | 10/2008 | Bowler | .................. | G01R 27/02 324/715 |
| 7,785,079 B2 * | 8/2010 | Ono | ....................... | F04B 49/103 417/63 |
| 8,816,677 B2 | 8/2014 | LaCroix | | |
| 9,735,658 B2 * | 8/2017 | Woo | ....................... | H02K 11/215 |
| 9,739,638 B2 * | 8/2017 | Kouno | .................. | G01D 5/145 |
| 11,070,112 B2 * | 7/2021 | Shimokawa | ........... | H02K 15/03 |
| 11,143,174 B2 * | 10/2021 | Baek | ..................... | F04B 35/002 |
| 2002/0118011 A1 * | 8/2002 | Wolf | ...................... | G01B 7/023 324/207.2 |
| 2005/0058376 A1 * | 3/2005 | Oohira | .................. | F16C 41/007 384/448 |
| 2008/0297143 A1 * | 12/2008 | Tanaka | .................... | G01P 3/487 384/624 |
| 2009/0001970 A1 * | 1/2009 | Tokunaga | .............. | G01D 5/145 324/207.21 |
| 2011/0020162 A1 | 1/2011 | Izawa et al. | | |
| 2011/0080162 A1 * | 4/2011 | Steinich | ............... | G01B 7/30 324/207.25 |
| 2011/0120300 A1 * | 5/2011 | Fletcher | ............. | F15B 15/2861 29/888.021 |
| 2011/0187357 A1 * | 8/2011 | Steinich | ................. | G01D 5/142 324/207.25 |
| 2011/0273169 A1 * | 11/2011 | LaCroix | ............... | G01D 5/145 324/207.25 |
| 2016/0238410 A1 * | 8/2016 | Steinich | ............... | G01D 5/145 |
| 2019/0003467 A1 * | 1/2019 | Domke | ................... | F04B 27/18 |
| 2019/0233008 A1 * | 8/2019 | Andreas | ............... | B62D 15/0215 |
| 2022/0011140 A1 * | 1/2022 | Gromes | ............... | G01D 5/2458 |

FOREIGN PATENT DOCUMENTS

| | | |
|---|---|---|
| DE | 202009008372 U1 | 9/2009 |
| DE | 102008052804 A1 | 4/2010 |
| JP | S5882082 A | 5/1983 |
| JP | 2017207433 A | 11/2017 |
| WO | WO-2010043478 A2 * | 4/2010 ............ G01D 5/145 |
| WO | 2010043478 A3 | 1/2011 |

* cited by examiner

PRIOR ART

PRIOR ART

AXIAL PISTON PUMP

CROSS-REFERENCE TO RELATED APPLICATIONS

This application is a continuation of U.S. application Ser. No. 17,125,881 filed Dec. 17, 2020, which applications claims priority to EP Patent Application Serial No. 19218312.7, filed Dec. 19, 2019, both titled "AXIAL PISTON PUMP," the content of both of which are incorporated by reference into this application in their entirety.

FIELD OF THE INVENTION

The present invention relates to an axial piston pump, on the swash plate of which a magnet encoder is arranged.

BACKGROUND OF THE INVENTION

Axial piston pumps are devices used in hydraulics to convert mechanical energy into hydraulic energy. They are used in industrial applications, such as in heavy machinery and plastic machinery, as well as in mobile work machines. A distinction is thus made between inclined-axis pumps and swash plate pumps. Axial piston pumps can have a constant or variable delivery volume and a constant or variable delivery direction.

A further field of application of axial piston pumps is the use in hydrostatic transmissions in vehicles. Here, power (rotational speed and torque) is transmitted via an oil pressure of a maximum of 500 bar. The oil flow is continuously controllable, resulting in a continuously adjustable transmission with very high power density. Typical fields of application are excavators, wheel loaders, tractors, snow groomers, combine harvesters and many other slow-moving vehicles. To monitor the operation of an axial piston pump, a magnet can be attached to a movable element of the axial piston pump. The movement of the magnet can then be monitored by a magnetic field sensor which is attached to a housing of the axial piston pump.

EP 0 343 581 A1 describes the attachment of a number of magnets which are arranged in a line on a piston of the axial piston pump in a direction identical to the reciprocal movement of the piston. The magnetic field sensor then generates pulse signals, whose number correlates to a number of magnets opposite the sensor. The number of pulses generated by the sensor can be counted using a counting device. However, this makes it necessary to firmly install the magnets in the piston.

Another possibility for monitoring an axial piston pump by means of a magnetic field sensor is to attach a magnetic encoder to its swash plate. In this way, the angular position of the swash plate can be determined. However, when the ferromagnetic pistons of the axial piston pump move, they function as a source of interference to the magnetic field of the magnetic encoder. Maladjustments of such a magnetic encoder lead to considerable non-linearities.

DE 40 15 006 A1 describes a swash plate compressor having a magnetic field sensor which detects movements of a permanent magnet connected to the swash plate. A disturbing influence of a magnetic leakage flow of a coupling coil mounted on the compressor on the measurement result of a delivery rate detector is suppressed by suitable feeding of the coupling coil.

DE 20 2009 008 372 U1 describes a magnetic encoder having two frontally polarised permanent magnets which are arranged on a base plate made of a magnetically conductive steel sheet.

From DE 10 2008 052 804 A1, a magnetic rotary encoder is known, which consists of a plastic-bonded anisotropic hard ferrite. It has a preferred magnetic direction which runs in an arched direction from one half to the other half of the front side of the rotary encoder which points to a magnetic sensor fixed on the front of the rotary encoder.

US 2002/0118011 A1 describes a position sensor for determining a linear or radial position. This sensor comprises two metal plates with two magnets each, wherein a Hall-effect sensor is arranged between the metal plates.

DE 34 23 722 A1 describes an inductive proximity switch having a sensor field in front of its active surface for a permeable trigger and having an oscillator whose oscillating circuit has a pot-shaped ferrite shell core. The ferrite shell core is short-circuited by a yoke having a saturation-sensitive position, which is arranged between two bar magnets magnetically connected in series.

An object of the invention is to provide a way of monitoring an axial piston pump by means of a component which can be subsequently attached to it without the monitoring being disturbed by the movement of the ferromagnetic pistons of the axial piston pump. In addition, the component should be largely insensitive to maladjustments.

SUMMARY

This object is solved by an axial piston pump, on whose swash plate a magnetic encoder is arranged. This has at least two permanent magnets and a plate consisting of a ferromagnetic material. In particular, the ferromagnetic material can be steel. The permanent magnets are arranged on the plate in such a way that each faces a magnetic pole towards the plate and this pole is at least partially covered by the plate. Preferably, at least 80% of the surface of each pole is covered by the plate. More preferably, each pole is completely covered by the plate. In this case, the dimensions of the plate correspond at least to the surface area spanned by the permanent magnets. However, the plate can also be larger.

It has been shown that, when using at least two magnets, preferably exactly two magnets, their arrangement on the plate prevents a magnetic field sensor from being significantly affected by the movement of the pistons of an axial piston pump. At the same time, such a magnetic encoder can be designed to be compact such that only a small amount of installation space is used in the axial piston pump and its weight does not cause any imbalance on the swash plate.

When exactly two permanent magnets are used, the two permanent magnets are preferably arranged in such a way that one permanent magnet faces its south pole towards the plate and the other permanent magnet faces its north pole towards the plate. This enables a simple differentiation of both permanent magnets by the sensor, whereby non-linearities occurring due to a possible maladjustment of the magnetic encoder can be easily compensated.

In order to minimise the influence of the pistons of the axial piston pump on the magnetic field sensor, it is preferable that a distance between the permanent magnets and the plate is a maximum of 500 μm, more preferably a maximum of 100 μm. This distance can be, for example, a constructional air gap between the permanent magnets and the plate, or it can be filled by a non-ferromagnetic filling material, which may also serve to bond the plate to the permanent magnets. Particularly preferably, both permanent magnets are preferably placed on the plate without gaps.

The thickness of the plate is preferably in the range of from 0.5 mm to 1.2 mm, more preferably in the range of from 0.6 mm to 1.0 mm and most preferably in the range of from 0.7 mm to 0.9 mm. If the plate is thinner, the magnetic field sensor is more strongly influenced by the movement of the pistons of the axial piston pump. A thicker plate no longer causes a substantial improvement in shielding against the interference effects of the piston movement. Instead, it merely results in an enlargement of the design and increases the weight of the magnetic encoder.

To avoid short-circuiting the permanent magnets, it is preferable that all surfaces of the permanent magnets which do not contact the plate are surrounded by at least one non-ferromagnetic material. In this respect, the plate can also have curvatures, as long as this does not cause it to extend between the permanent magnets. The non-ferromagnetic material is in particular a plastic.

In a particularly simple embodiment of the axial piston pump, the permanent magnets are attached to the plate without the aid of an additional component. In order to surround them with a non-ferromagnetic material, which is not just air, they can then be over-moulded with a casting compound, for example. However, the magnetic encoder preferably has a housing made of a non-ferromagnetic material. This has two recesses in which the permanent magnets are arranged. The recesses are covered by the plate. This allows an easy production of the magnetic encoder by inserting the permanent magnets into the recesses of housing and then closing them by attaching the plate to the housing. In principle, the housing can also have further production-related recesses which do not serve to accommodate permanent magnets.

In order to attach the magnetic encoder to the swash plate, it is preferable that the housing has at least one fastening element. This fastening element is designed to be fastened to the swash plate. In order to prevent maladjustment of the magnetic encoder, it is preferred that the housing has several fastening elements. The at least one fastening element is arranged on the same side of the housing as the plate. Since the fastening element is turned towards the swash plate when the magnetic encoder is attached to the swash plate, this causes the plate to face towards the piston of the axial piston pump such that it can shield the permanent magnets from the pistons of the axial piston pump.

The axial piston pump has several pistons. The magnetic encoder is arranged on a swash plate of the axial piston pump. Furthermore, the axial piston pump has a magnetic field sensor, in particular a Hall-effect sensor. This is arranged in such a way that it faces towards the magnetic encoder. If the angle of the swash plate changes in relation to a pump shaft, this causes a movement of the magnetic encoder relative to the magnetic field sensor, which can be detected by means of the magnetic field sensor. From this movement, a conclusion on the angle of the swash plate and thus on the operating condition of the axial piston pump is possible.

The plate is preferably arranged between the magnetic field sensor and the pistons of the axial piston pump in such a way that the plate faces towards the piston. The permanent magnets then face towards the magnetic field sensor. This allows the plate to shield the permanent magnets and the magnetic field sensor from the pistons.

In one position of the swash plate, the plate of the magnetic field sensor is preferably arranged in parallel to the pistons. This can in particular be a rest position of the swash plate, in which it is at a known predetermined angle to the pump shaft. This arrangement of the magnetic field sensor allows a very simple and reliable determination of the angle of the swash plate. Furthermore, it is preferable that the longitudinal axes of both permanent magnets are arranged, in one position of the swash plate, parallel to the pistons. This position is in particular a rest position of the swash plate. This arrangement of the permanent magnets minimises the influence of the pistons on the position determination of the magnetic encoder by the magnetic field sensor.

BRIEF DESCRIPTION OF THE DRAWINGS

Exemplary embodiments of the invention are depicted in the drawings and explained in more detail in the following description.

DETAILED DESCRIPTION OF THE INVENTION

Figure 1A:
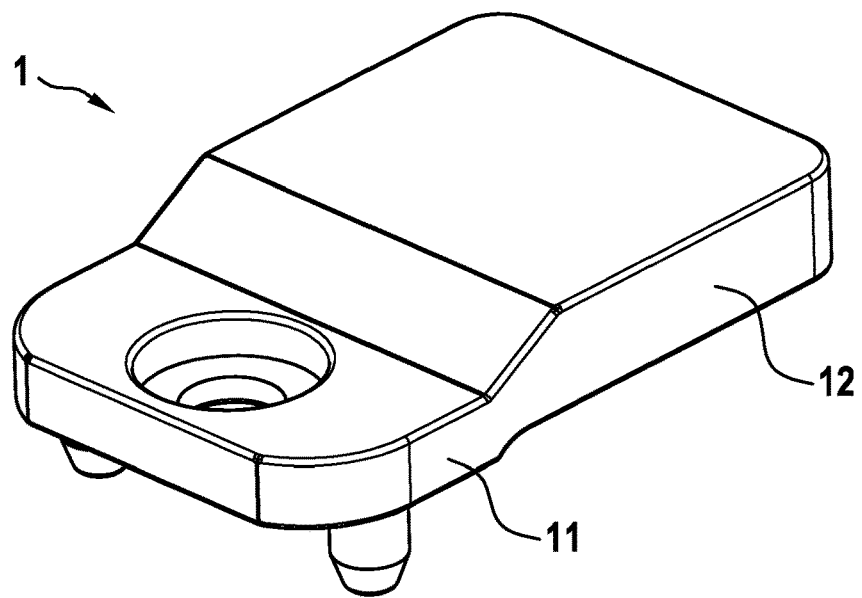
FIGS. 1a and 1b each show an isometric view of a housing of a magnetic encoder according to an exemplary embodiment of the invention.
Figure 1B:
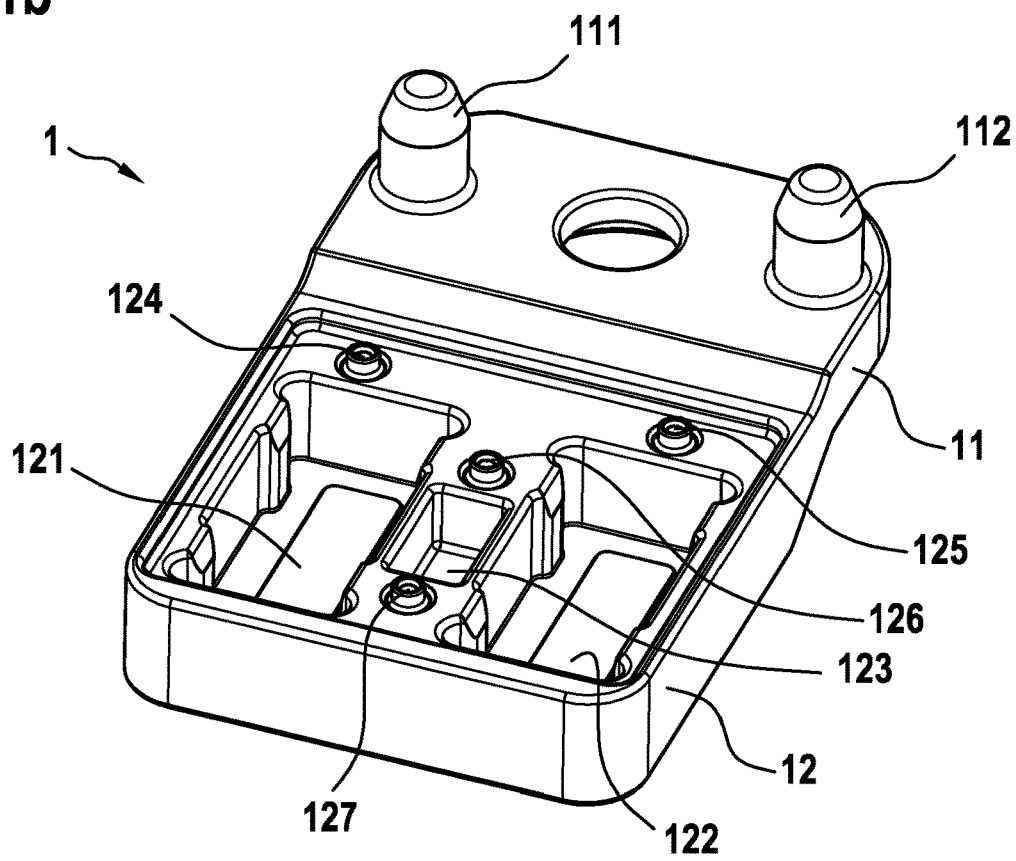

In FIGS. 1a and 1b, a housing 1 of a magnetic encoder according to an exemplary embodiment of the invention is depicted. This housing 1 consists of zinc and can be produced by means of die casting. It is divided into a first section 11 and a second section 12, which are integrally connected to each other. The housing 1 is shown in FIG. 1a from its upper side and in FIG. 1b from its underside. The first section 11 is thinner than the second section 12, wherein the second section 12 protrudes towards the upper side of the housing 1 in relation to the first section 11. The first section 11 has two fastening elements 111, 112 in the form of pins on the underside. These serve to precisely adjust the position of the magnetic encoder on a swash plate. The second section 12 is open towards the underside. It has two substantially cuboid recesses 121, 122, whose longitudinal axes run in parallel and extend towards the first section 11. These two recesses 121, 122 are designed to accommodate permanent magnets. A third recess 123, which is not provided to accommodate a permanent magnet, is arranged between the first two recesses 121, 122. It is used for manufacturing the housing 1 in a die casting process. Four pins 124 to 127 are arranged in the second section and extend away from the underside. They serve to connect the housing 1 to a plate which closes the first two recesses 121, 122.

Figure 2:
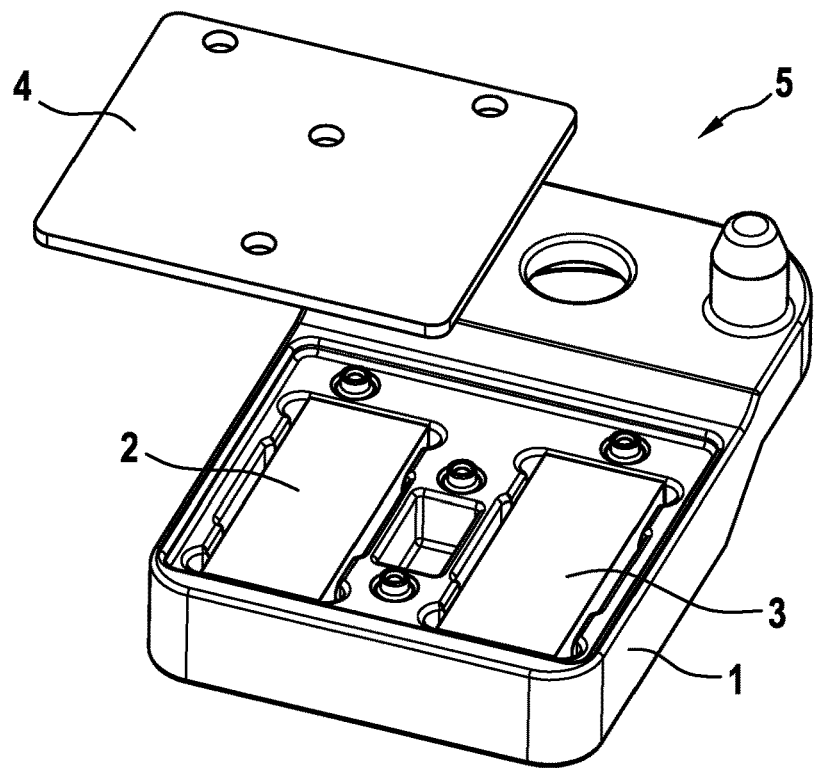
FIG. 2 shows an isometric view of a magnetic encoder according to an exemplary embodiment of the invention having a removed plate.

In FIG. 2, it is depicted how two permanent magnets 2, 3 can be arranged in the two recesses 121, 122 of the housing 1. Furthermore, a plate 4, which consists of steel, is depicted. This has four openings whose positions correspond to the positions of the pins 124 to 127. The housing 1, the two permanent magnets 2, 3 and the plate 4 together form a magnetic encoder 5 according to an exemplary embodiment of the invention.

Figure 3:
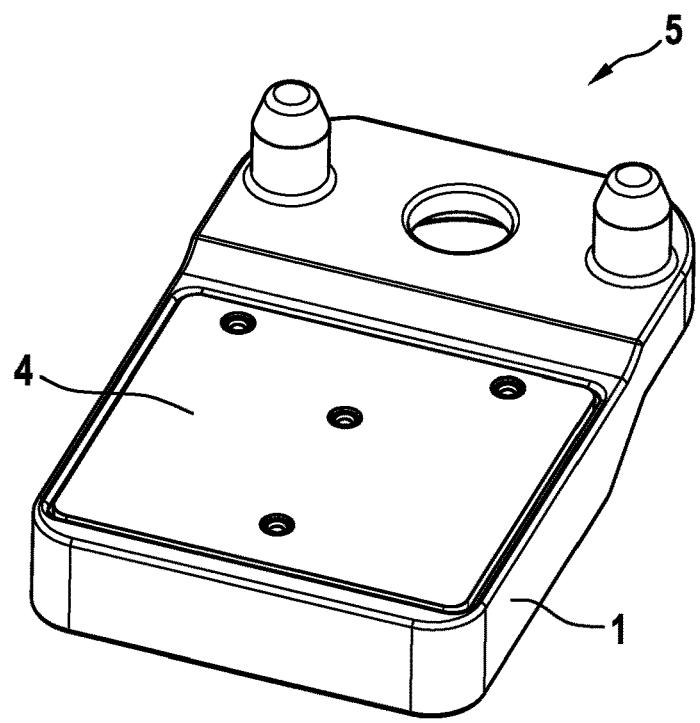
FIG. 3 shows an isometric view of a magnetic encoder according to an exemplary embodiment of the invention.

In FIG. 3, the magnetic encoder 5 is depicted in its assembled state. The plate 4 now covers all recesses 121 to 123 in the second section 12 of the housing 1. It is pressed with the pins 124 to 127 in such a way that it rests without gaps on the two permanent magnets 2, 3. Here, it completely covers the two permanent magnets 2, 3 and also extends beyond the rectangular surface area spanned by the permanent magnets 2, 3.

Figure 4:
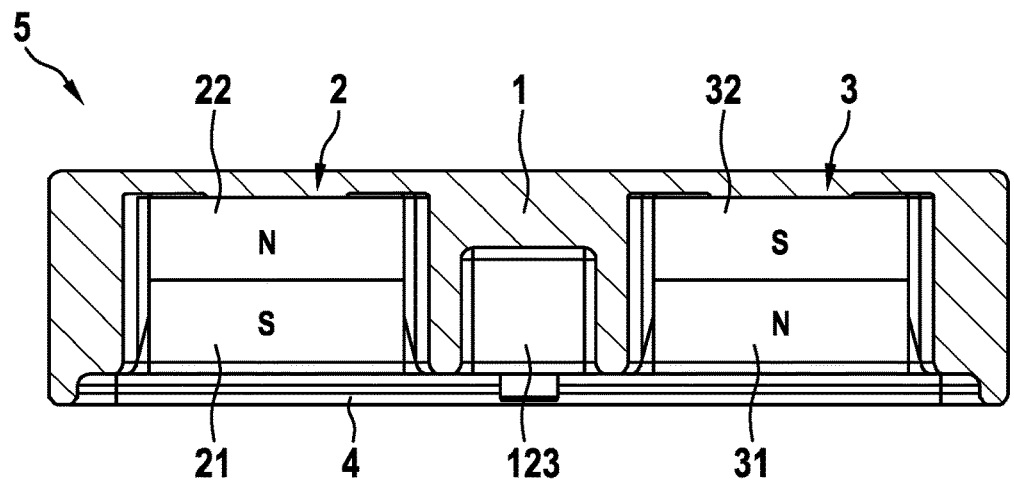
FIG. 4 shows a schematic sectional view of a magnetic encoder according to an exemplary embodiment of the invention.

A sectional view of the magnetic encoder 5 transverse to the longitudinal axis of the permanent magnets 2, 3 is depicted in FIG. 4. The permanent magnets 2, 3 are each polarised in such a way that one of their poles faces towards the plate 4 and contacts it, whereas the other pole faces away from the plate 4 and contacts the housing 1. Here, the south pole 21 of the first permanent magnet 2 faces towards the plate 4 and its north pole 22 faces away from it. The north pole 31 of the second permanent magnet 3 faces towards the plate 4 and its south pole 32 faces away from it. Except of the underside of the magnetic encoder 5, on which the permanent magnets 2, 3 contact the plate 4, the permanent magnets 2, 3 are surrounded by zinc of the housing 1.

Figure 5:
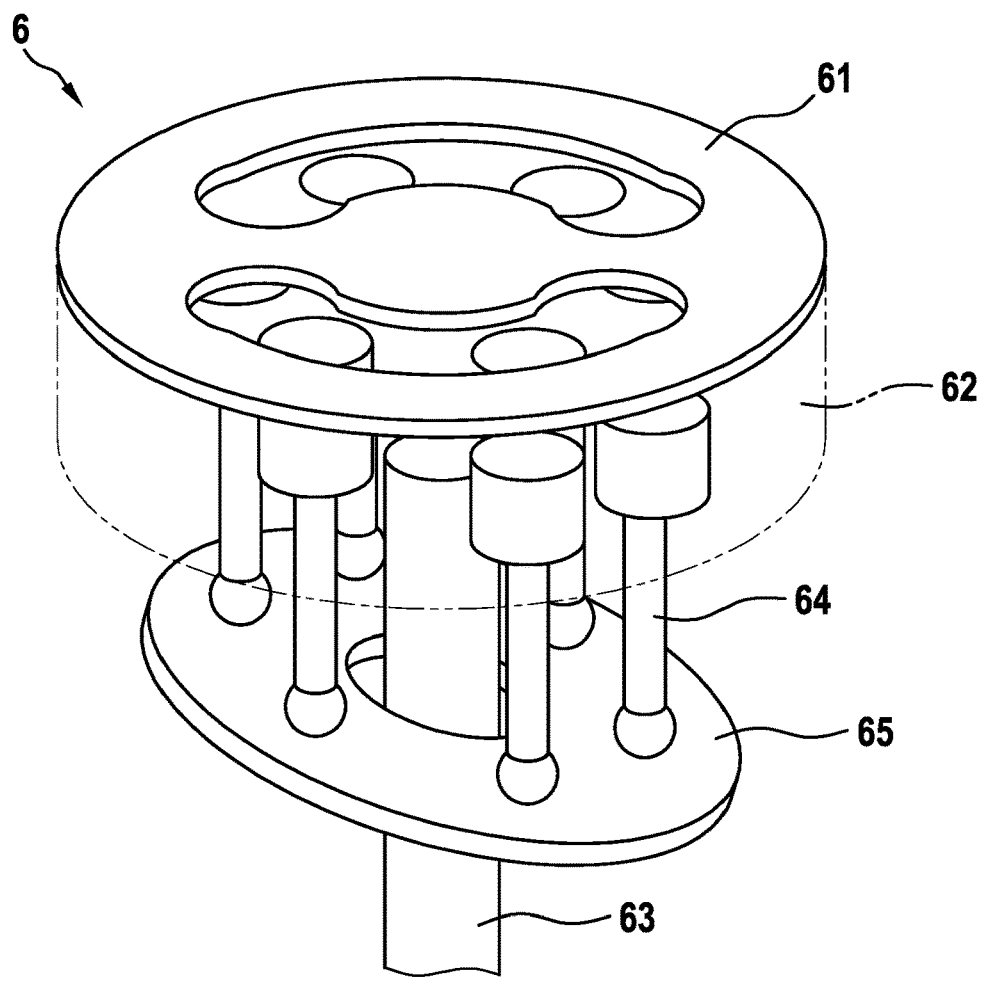
FIG. 5 shows a schematic view of elements of an axial piston pump.

FIG. 5 shows the construction of a conventional axial piston pump 6, which is designed as a swash plate pump. A rotatable drum 62 is arranged on a control disk 61, which can be set in rotation via a pump shaft 63. This has six pistons 64, which are each mounted on an inclined swash plate 65.

Figure 6:
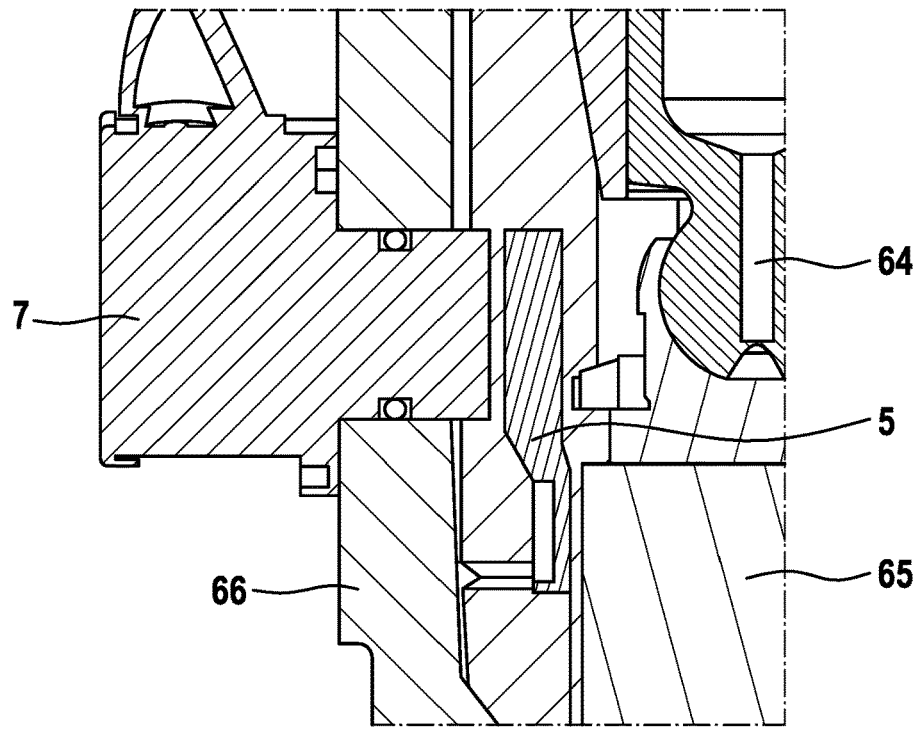
FIG. 6 shows, in a schematic sectional view, the arrangement of a magnetic encoder in an axial piston pump in an exemplary embodiment of the invention.

FIG. 6 shows how the magnetic encoder 5 can be arranged on the swash plate 65 according to the above-described exemplary embodiment. It is fastened to the swash plate 65 with its fastening elements 111, 112 in such a way that the underside of its second section 12 and thus the plate 4 faces towards the pistons 64. The pump housing 66, which encloses the elements of the axial piston pump 6, has an opening in the area of the magnetic encoder 5, through which a magnetic field sensor 7 in the form of a Hall-effect sensor is guided. This allows movements of the permanent magnets 2, 3 in the magnetic encoder 5 to be detected and the angle of the swash plate 65 in relation to the pump shaft 63 to thus be deduced. The pistons 64, which consist of ferromagnetic steel, only minimally disturb the magnetic field of the two permanent magnets 2, 3 during their movement, since they are shielded from the pistons 64 by the plate 4. In addition, the longitudinal axes of the permanent magnets 2, 3 in the magnetic encoder 5 run in parallel to the longitudinal axes of the pistons 64.

Figure 7:
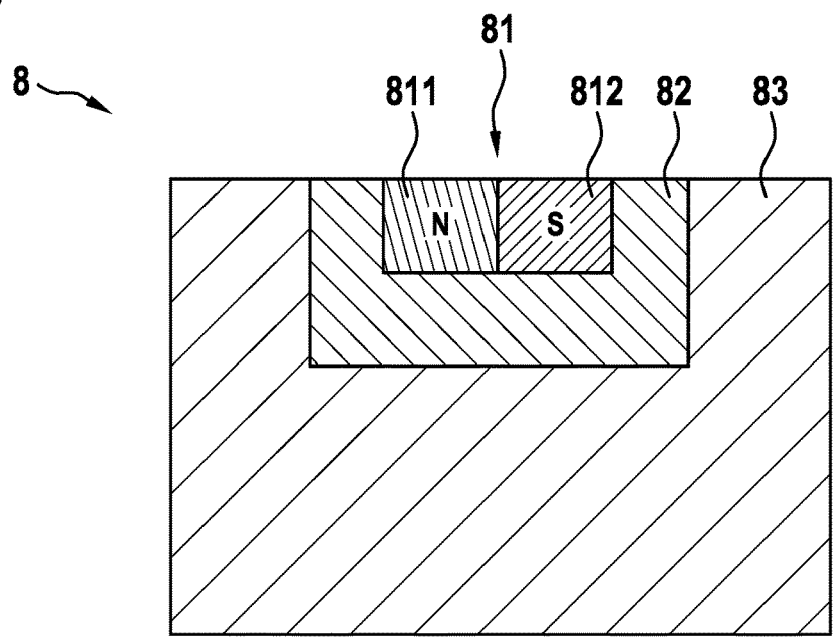
FIG. 7 shows a schematic sectional view of a magnetic encoder which is not in accordance with the invention.

As a comparative example, FIG. 7 schematically depicts the construction of a magnetic encoder 8 which is not in accordance with the invention. This has a single permanent magnet 81 having two poles 811, 812. Here, the north pole 811 is located on one end of the longitudinal axis of the permanent magnet 81 and its south pole 822 is located on the other end of its longitudinal axis. While one side surface of the permanent magnet 81 is exposed, its other side surfaces are surrounded by a non-ferromagnetic plastic 82. This in turn is surrounded by a metal housing 83. Orthogonally to the longitudinal axis of the permanent magnet 81, this is distanced by 4 mm from the metal housing 83 by means of the plastic material 82.

Figure 8A:
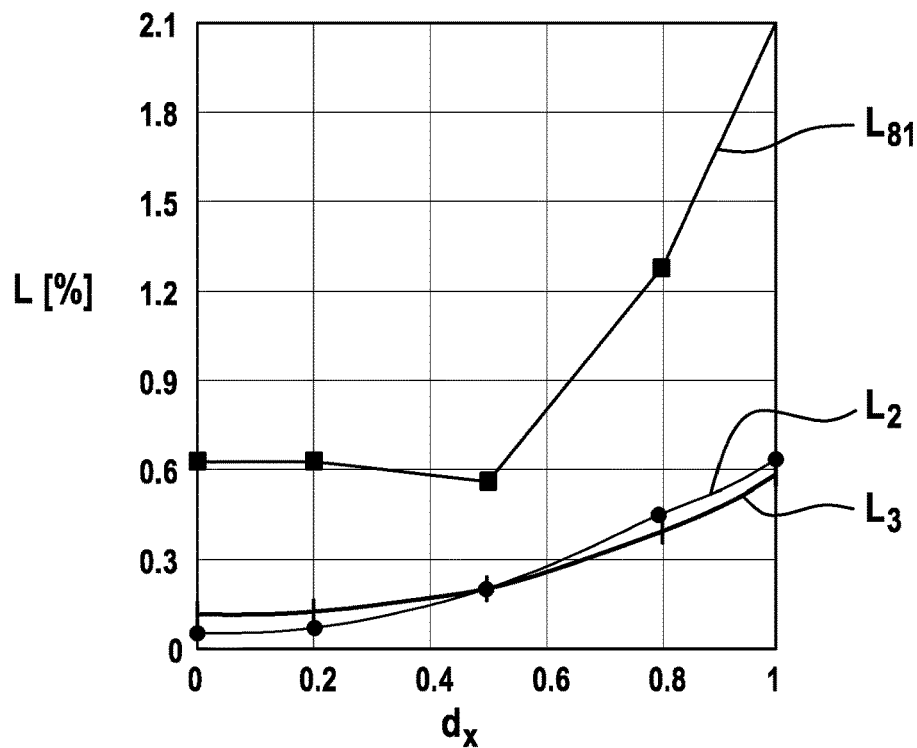
FIGS. 8a and 8b show, in diagrams, changes in linearity in the event of maladjustment of a magnetic encoder on a swash plate.
Figure 8B:
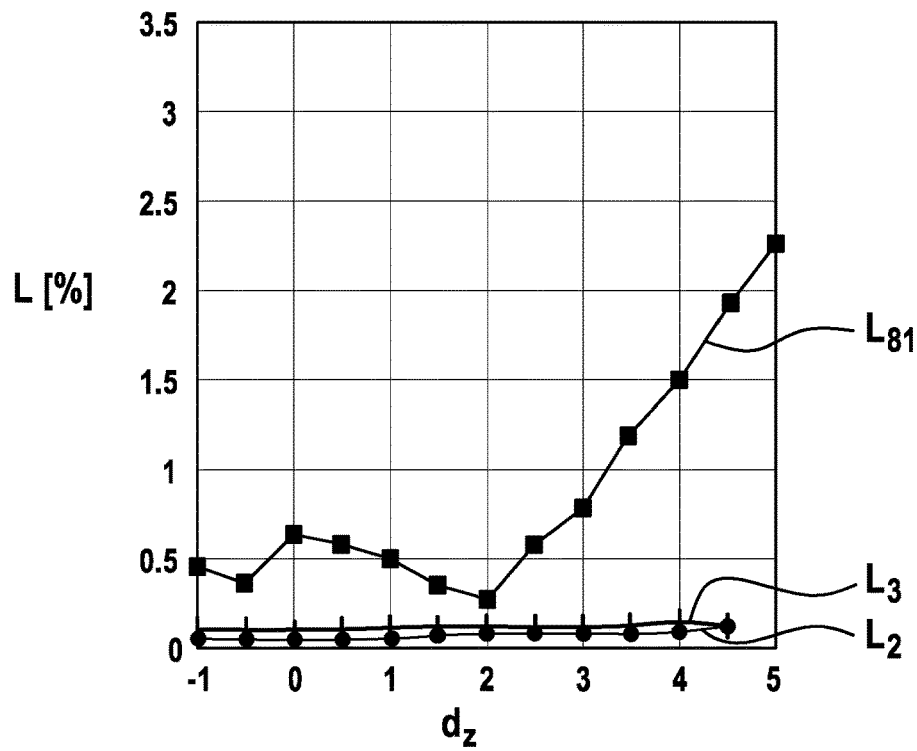

Changes in the linearity L of the magnetic encoder 5 according to the invention and the magnetic encoder 8 not according to the invention when arranged in an axial piston pump 6 in the manner depicted in FIG. 6 are depicted in FIGS. 8a and 8b for different maladjustments of the magnetic encoders 5, 8. Here, FIG. 8a shows the influence of maladjustments $d_x$ along the plane of the magnetic encoder 5, 8, and FIG. 8b shows the influence of maladjustments $d_z$ of the magnetic encoder 5, 8 along an axis between the piston 64 and the magnetic field sensor 7. Since the magnetic encoder 5 according to the invention has two permanent magnets 2, 3, the changes in the linearity $L_2$, $L_3$ are set out for the two permanent magnets 2, 3, while for the magnetic encoder 8 which is not in accordance with the invention, only the change in linearity $L_{81}$ of its individual permanent magnet 81 is depicted. It can be seen that a radial maladjustment $d_x$ of the magnetic encoder 5 according to the invention leads to considerably fewer non-linearities than with the magnetic encoder 8 not in accordance with the invention. In addition, the magnetic encoder 5 according to the invention is substantially insensitive to an offset between the piston 64 and the magnetic field sensor 7, while the magnetic encoder 8 not in accordance with the invention also reacts to this with considerable non-linearities.

Figure 9:
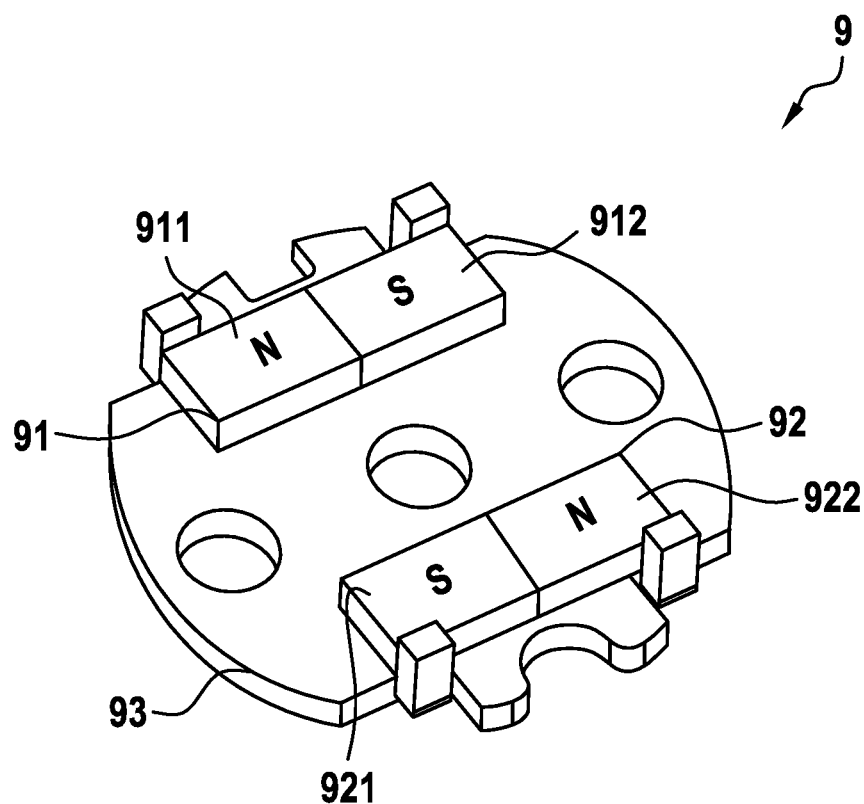
FIG. 9 shows an isometric view of another magnetic encoder which is not in accordance with the invention.

As a further comparative example, FIG. 9 depicts the design of a magnetic encoder 9 not in accordance with the invention according to DE 20 2009 008 372 U1. This has two parallel permanent magnets 91, 92 each having two poles 911, 912, 921, 922. Here, the north pole 911 of the first permanent magnet 91 is located on a first end of the longitudinal axis of the first permanent magnet 91, and its south pole 912 is located on the second end of its longitudinal axis. The south pole 921 of the second permanent magnet 92 is located on the first end of the longitudinal axis of the second permanent magnet 921 and its north pole 922 is located on the second end of its longitudinal axis. Thus both permanent magnets 91, 92 are oppositely polarised. The permanent magnets 91, 92 are arranged on a plate 93 made of sheet steel.

In order to compare the magnetic encoder 5 according to the invention with the magnetic encoder 9 according to DE 20 2009 008 372 U1, simulations of two magnetic encoders were carried out, which each have two cuboid permanent magnets having a length of 16.25 mm in the x-direction, a width of 6.6 mm in the y-direction and a height of 4.5 mm in the z-direction. These are arranged at a distance of 6.5 mm from each other in the y-direction and each have a nominal remanence of 1.1 T. A polarisation of the permanent magnets was assumed in the z-direction for the magnetic encoder according to the invention, and in the x-direction for the magnetic encoder not according to the invention, wherein the two permanent magnets were polarised in opposite directions. At a distance of 6 mm in the z-direction, it resulted in a magnetic flux density of 50 mT for the magnetic encoder according to the invention, and a magnetic flux density of 1.1 µT for the magnetic encoder not according to the invention. A distance of 6 mm is structurally necessary in the arrangement according to FIG. 6 between the magnetic encoder 5 and the magnetic field sensor 7. For the function of the magnetic field sensor 7, a magnetic flux density in the range of from 30 mT to 90 mT at the magnetic field sensor 7 is recommended. This shows that the magnetic encoder 9 not in accordance with the invention, unlike the magnetic encoder 5 according to the invention, is not suitable for monitoring an axial piston pump 6 by attaching it to a swash plate 65.

We claim:

1. An axial piston pump (6) having several pistons (64), having a magnetic encoder (5) arranged on a swash plate (65), and a magnetic field sensor (7) which is arranged in such a way that it faces towards the magnetic encoder (5), characterised in that the magnetic encoder (5) has exactly two separate permanent magnets (2, 3) and a plate (4), which consists of a ferromagnetic material, wherein the two separate permanent magnets (2, 3) are arranged on the plate (4) in such a way that they are spaced apart from one another and where each face only one magnetic pole (21, 31) towards the plate (4), and each pole (21, 31) is at least partially covered by the plate (4) in each case, and where all surfaces of the two separate permanent magnets (2, 3) which do not contact the plate are surrounded by at least one non-ferromagnetic material and where the magnetic encoder (5) has a housing (1) made of a non-ferromagnetic material which has two recesses (121, 122) covered by the plate (4) in which the two separate permanent magnets (2, 3) are arranged.

2. The axial piston pump (6) according to claim 1, characterised in that a first of the two separate permanent magnets (2) faces its south pole (21) towards the plate (4), and a second of the two separate permanent magnet (3) faces its north pole (31) towards the plate (4).

3. The axial piston pump (6) according to claim 1, characterised in that a distance between the two separate permanent magnets (2, 3) and the plate (4) is in each case a maximum of 500 µm.

4. The axial piston pump (6) according to claim 1, characterised in that the plate (4) has a thickness in the range of from 0.5 mm to 1.2 mm.

5. The axial piston pump (6) according to claim 1, characterised in that the housing (1) has at least one fastening element (111, 112) for fastening to the swash plate (65), wherein the at least one fastening element (111, 112) is arranged on the same side of the housing (1) as the plate (4).

6. The axial piston pump (6) according to claim 1, characterised in that the plate (4) is arranged between the magnetic field sensor (5) and the pistons (64) in such a way that the plate (4) faces the pistons (64) and the two separate permanent magnets (2, 3) face the magnetic field sensor (7).

7. The axial piston pump (6) according to claim 1, characterised in that the plate (4) is arranged, in one position of the swash plate (65), parallel to the pistons (64).

8. The axial piston pump (6) according to claim 1, characterised in that the longitudinal axes of both of the two separate permanent magnets (2, 3) are arranged, in one position of the swash plate (65), parallel to the pistons (64).

9. The axial piston pump (6) according to claim 2, characterised in that a distance between the two separate permanent magnets (2, 3) and the plate (4) is in each case a maximum of 500 µm.

10. The axial piston pump (6) according to claim 2, characterised in that the plate (4) has a thickness in the range of from 0.5 mm to 1.2 mm.

11. An axial piston pump (6) having several pistons (64), having a magnetic encoder (5) arranged on a swash plate (65), and a magnetic field sensor (7) which is arranged in such a way that it faces towards the magnetic encoder (5), characterised in that the magnetic encoder (5) has at least two separate permanent magnets (2, 3) and a plate (4), which consists of a ferromagnetic material, wherein the at least two separate permanent magnets (2, 3) are arranged on the plate (4) in such a way that they are spaced apart from one another and where the at least two separate permanent magnets each face only one magnetic pole (21, 31) towards the plate (4), and each pole (21, 31) is at least partially covered by the plate (4) in each case, and where all surfaces of the at least two separate permanent magnets (2, 3) that do not face the plate (2, 3) do not contact magnetic material.

12. The axial piston pump (6) according to claim 11, characterised in that a first of the at least two separate permanent magnets (2) faces its south pole (21) towards the plate (4), and a second of the at least two separate permanent magnets (3) faces its north pole (31) towards the plate (4).

13. The axial piston pump (6) according to claim 11, characterised in that a distance between the at least two permanent magnets (2, 3) and the plate (4) is in each case a maximum of 500 µm.

14. The axial piston pump (6) according to claim 11, characterised in that the plate (4) has a thickness in the range of from 0.5 mm to 1.2 mm.

15. The axial piston pump (6) according to claim 11, characterised in that all surfaces of the at least two separate permanent magnets (2, 3) that do not contact the plate are surrounded by non-ferromagnetic material.

16. The axial piston pump (6) according to claim 15, characterised in that the magnetic encoder (5) has a housing (1) made of a non-ferromagnetic material, which has two recesses (121, 122) in which the at least two separate permanent magnets (2, 3) are arranged, wherein the recesses (121, 122) are covered by the plate (4).

17. An axial piston pump (6) having several pistons (64), having a magnetic encoder (5) arranged on a swash plate (65), and a magnetic field sensor (7) which is arranged in such a way that it faces towards the magnetic encoder (5), characterised in that the magnetic encoder (5) has exactly two separate permanent magnets (2, 3) and a plate (4), which consists of a ferromagnetic material, wherein the two separate permanent magnets (2, 3) are arranged on the plate (4) in such a way that they are spaced apart from one another and where each face only one magnetic pole (21, 31) towards the plate (4), and each pole (21, 31) is at least partially covered by the plate (4) in each case and where the magnetic encoder (5) has a housing (1) made of a non-ferromagnetic material, which has two recesses (121, 122) in which the two separate permanent magnets (2, 3) are arranged, wherein the recesses (121, 122) are covered by the plate (4).

18. The axial piston pump (6) according to claim 1, characterised in that a first of the two separate permanent magnets (2) faces its south pole (21) towards the plate (4), and a second of the two separate permanent magnet (3) faces its north pole (31) towards the plate (4).

* * * * *